United States Patent [19]

Fowler et al.

[11] 4,004,348

[45] Jan. 25, 1977

[54] HIGH PRESSURE COMPASS HOUSING

[75] Inventors: John T. Fowler; William H. Key, both of Winthrop, Mass.

[73] Assignee: The Laitram Corporation, New Orleans, La.

[22] Filed: Jan. 16, 1975

[21] Appl. No.: 541,655

[52] U.S. Cl. .................................. 33/364; 73/431
[51] Int. Cl.[2] ....................................... G01C 17/06
[58] Field of Search .......... 33/355 R, 364; 73/431, 73/170 A

[56] References Cited

UNITED STATES PATENTS

| 2,350,402 | 6/1944 | Krasnow et al. | 33/364 |
| 2,428,346 | 9/1947 | White | 33/364 |
| 3,949,483 | 4/1976 | White | 33/355 R |

Primary Examiner—William D. Martin, Jr.
Attorney, Agent, or Firm—Weingarten, Maxham & Schurgin

[57] ABSTRACT

A compass housing capable of withstanding high external pressure such as encountered in deep submergence applications. The housing includes a pair of hemispherical portions interconnected to form a sealed enclosure and at least one portion being formed of a resilient material capable of expansion and contraction in the presence of varying differential pressure conditions. The housing is completely filled with a damping liquid under pressure to provide an internal pressure higher than atmospheric pressure such that in the presence of higher external pressures, the inner and outer pressures tend to equalize, thereby minimizing the differential pressure on the housing itself.

3 Claims, 1 Drawing Figure

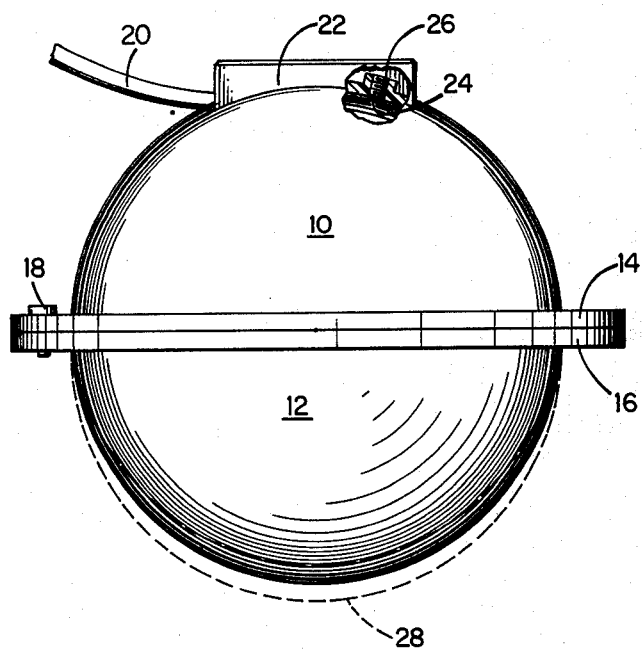

4,004,348

HIGH PRESSURE COMPASS HOUSING

FIELD OF THE INVENTION

This invention relates to magnetic compasses and more particularly to a compass housing adapted for use in a high pressure environment such as deep submergence in the ocean, and a technique for providing the same.

BACKGROUND OF THE INVENTION

Remote reading magnetic compasses are known for providing an electrical output signal representative of compass heading. A particularly effective remote reading compass is the subject of U.S. Pat. No. 3,833,901 assigned to the assignee of this invention in which a compass disk is coded by a plurality of selectively light transmissive and opaque optical tracks which are electro-optically sensed to provide an output indication of compass heading in the form of a plurality of digital output signals which can be conveyed to a suitable display for providing a numerical or other visual representation of heading. Such compasses are typically employed on ships or marine buoys in which usual sea level pressures are encountered. Such remote reading compasses are, however, also useful in submerged or other high pressure environments and thus the compass housing must be capable of withstanding the often enormous pressure of the working depth. In order to withstand a high external pressure, the compass housing must be of a material of sufficient strength to retain its integrity in the presence of such high pressure. In general, a high pressure compass housing would be of a construction different than that employed for surface operation where high operating external pressures are not encountered.

SUMMARY OF THE INVENTION

In accordance with the invention, a compass housing is provided capable of withstanding high external pressure without necessity for materials having higher inherent strength than for atmospheric pressure. Briefly, a compass housing according to the invention comprises, in preferred embodiment, a pair of hemispherical housing portions having mating peripheral flanges interconnected to form a sealed enclosure for the compass structure. At least one of the housing portions is formed of a resilient material capable of expansion and compression in accordance with the differential pressure conditions thereon as the compass is lowered to or raised from ocean depths. The housing is completely filled with damping liquid which may be at a higher than atmospheric internal pressure. To provide such higher internal pressure, damping liquid is supplied to the housing to cause expansion of the resilient housing portion to create the intended internal pressure.

In the presence of high external pressure, such as at a submerged ocean depth, the resilient housing portion is urged inward causing increase in the internal housing pressure and thereby tending to equalize the differential pressure on the housing. The differential pressure may be fully equalized or may be less than the external pressure actually present depending on particular parameters of an operating environment. In some instances, it may be desirable to maintain a higher internal pressure than the operative external pressure, with a result that any leak which may occur in the housing structure will cause liquid flow from the housing interior to the external environment and thus prevent contamination of the housing interior by the environment.

DESCRIPTION OF THE DRAWING

The invention will be more fully understood from the following detailed description taken in conjunction with the accompanying drawing, the single FIGURE of which is an elevation view of a compass housing according to the invention.

DETAILED DESCRIPTION OF THE INVENTION

A compass housing according to the invention and capable of withstanding high external pressures is shown in the drawing and includes first and second hemispherical housing portions 10 and 12, each having a peripheral flange 14 and 16 respectively. The flanges are in sealed engagement to provide a sealed housing interior for containment of a damping liquid therein. The first hemispherical portion 10 is of a rigid nonmagnetic material typically a plastic material such as Lexan. The second housing portion 12 is of a resilient material, such as Neoprene, capable of expansion and compression in response to the differential pressure thereon. To form the sealed enclosure, the housing portions are interconnected by means of suitable fasteners 18 disposed through openings provided through flanges 14 and 16.

The magnetic compass, which itself forms no part of the present invention, is of the remote reading type such as is in the aforesaid United States Patent wherein digital output signals are provided to a remote display or other utilization apparatus for providing an indication of compass heading. The output signals are conveyed to utilization apparatus by means of an electrical cable 20 which is disposed within an electrical terminal box 22 provided on housing portion 10 and which can be sealed to provide isolation of the electrical wiring from the environment.

The housing is completely filled with a damping liquid via a filling opening or port 24 access to which is obtained through terminal box 22. A plug 26 is threadably disposed within port 24 for closure of the housing after filling with a damping liquid. The housing interior is according to the invention filled with damping liquid sufficient to produce an internal pressure higher than atmospheric pressure. The housing is completely filled with damping liquid through filling port 24 and is further filled to cause expansion of resilient housing portion 12, such as shown by dotted line 28 in the drawing. The damping liquid can be supplied under pressure to the housing to cause intended expansion of housing portion 12 or, alternatively, the housing portion can be expanded by vacuum or other means and damping liquid supplied without pressure to the housing interior.

In the presence of high external pressure such as at a submerged ocean depth, the external pressure exerted on the housing is offset by the internal housing pressure to achieve a differential pressure lower than the actually encountered external pressure. The differential pressure may be substantially zero if the internal and external pressures are fully equalized, or may be of a value less than the external pressure. Depending upon the values of the external and internal pressures on the housing, the differential pressure may be of either sense; that is, the net external pressure may be higher or the net internal pressure may be higher.

In some instances it is desirable to maintain a net higher internal pressure in the housing such that any leak in the housing will cause flow of damping liquid to the environment rather than opposite flow which could cause contamination of the housing interior by the environment.

It will be appreciated that the invention is not to be limited by what has been particularly shown and described except as indicated in the appended claims.

What is claimed is:

1. A magnetic compass housing comprising:
    first and second housing portions each having a mating peripheral flange adapted to be secured to the other;
    at least one of said housing portions being formed of a resilient material being impervious to the flow of fluid therethrough and operative to expand and compress in response to differential pressure thereon;
    means for attaching said mating peripheral flanges in sealing relationship to form a sealed housing interior;
    a damping liquid contained within said housing interior and completely filling said interior;
    said resilient housing portion being operative in the presence of a high external pressure to compress and cause the pressure of said damping liquid to increase to approximately the external pressure.

2. A magnetic compass housing according to claim 1 wherein said damping liquid contained within said housing interior is of a quantity sufficient to expand said resilient housing portion and produce a predetermined internal pressure higher than atmospheric pressure whereby any leak in said housing will cause the flow of damping liquid from the inside of the housing to the outside.

3. A magnetic compass housing according to claim 2 wherein said first and second housing portions are each of hemispherical configuration with said mating peripheral flanges being disposed at approximately the diameter thereof.

* * * * *